US010366388B2

(12) United States Patent
Campero et al.

(10) Patent No.: US 10,366,388 B2
(45) Date of Patent: Jul. 30, 2019

(54) METHOD AND APPARATUS FOR INFORMATION MANAGEMENT

(71) Applicant: TYCO FIRE & SECURITY GMBH, Neuhausen am Rheinfall (CH)

(72) Inventors: Richard Campero, Gilroy, CA (US); Graeme Jarvis, Marblehead, MA (US); Jason Ouellette, Southbridge, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 44 days.

(21) Appl. No.: 15/097,513

(22) Filed: Apr. 13, 2016

(65) Prior Publication Data

US 2017/0300898 A1  Oct. 19, 2017

(51) Int. Cl.
*G06Q 20/00* (2012.01)
*G06Q 20/36* (2012.01)
*H04L 29/06* (2006.01)
*H04L 9/32* (2006.01)

(52) U.S. Cl.
CPC ......... *G06Q 20/363* (2013.01); *G06Q 20/36* (2013.01); *G06Q 20/3676* (2013.01); *H04L 9/3236* (2013.01); *H04L 9/3247* (2013.01); *H04L 63/0853* (2013.01); *G06Q 2220/00* (2013.01); *H04L 63/0876* (2013.01)

(58) Field of Classification Search
None
See application file for complete search history.

(56) References Cited

U.S. PATENT DOCUMENTS

| 7,428,750 B1* | 9/2008 | Dunn ..................... G06F 21/41 726/8 |
| 9,595,034 B2* | 3/2017 | Van Rooyen ...... G06Q 20/3829 |
| 2015/0244690 A1* | 8/2015 | Mossbarger .......... H04L 63/061 713/171 |
| 2016/0005248 A1 | 1/2016 | Aase |
| 2016/0086175 A1 | 3/2016 | Finlow-Bates |
| 2016/0292672 A1* | 10/2016 | Fay ....................... G06Q 20/363 |
| 2016/0330035 A1* | 11/2016 | Ebrahimi ............... H04L 9/3265 |
| 2016/0342994 A1* | 11/2016 | Davis ..................... G06Q 20/027 |
| 2017/0011460 A1* | 1/2017 | Molinari ................. G06Q 40/04 |
| 2017/0046651 A1* | 2/2017 | Lin ..................... G06Q 20/0655 |
| 2017/0075938 A1* | 3/2017 | Black ...................... G06F 21/64 |

(Continued)

OTHER PUBLICATIONS https://en.wikipedia.org/wiki/Bitcoin, Bitcoin—Wikipedia, the free encyclopedia, 36 pgs., page last modified on Feb. 8, 2016.

(Continued)

*Primary Examiner* — Lynn D Feild
*Assistant Examiner* — Vadim Savenkov
(74) *Attorney, Agent, or Firm* — Foley & Lardner LLP

(57) ABSTRACT

Disclosed are techniques that use devices with corresponding identity wallet applications that execute on an electronic processor device of the devices, and which identity wallets store identity information and encrypt the stored identity information. A distributed ledger system, and a broker system that interfaces to the wallet and the distributed ledger are used for various information exchange scenarios in which a requesting system and user devices, the distributed ledger system, the broker system and the requesting system are interconnected via an electronic network through respective network interface devices.

20 Claims, 12 Drawing Sheets

(56) References Cited

U.S. PATENT DOCUMENTS

| | | | |
|---|---|---|---|
| 2017/0124535 A1* | 5/2017 | Juels | G06Q 20/065 |
| 2017/0177855 A1* | 6/2017 | Costa Faidella | G06F 21/45 |
| 2017/0180128 A1* | 6/2017 | Lu | H04L 9/321 |
| 2017/0213210 A1* | 7/2017 | Kravitz | G06Q 20/3829 |
| 2017/0221288 A1 | 8/2017 | Johnson | |
| 2017/0236121 A1* | 8/2017 | Lyons | G06O 20/102 |
| | | | 705/71 |
| 2017/0279801 A1* | 9/2017 | Andrade | H04L 63/0861 |
| 2017/0308872 A1* | 10/2017 | Uhr | G06Q 20/065 |
| 2018/0025166 A1* | 1/2018 | Daniel | G06F 9/5011 |

OTHER PUBLICATIONS https://en.bitcoin.it/wiki/Block_chain, Block chain—Bitcoin Wiki, 2 pgs., last modified Oct. 21, 2015.
https://www.usv.com/blog/bitcoin-as-protocol, Bitcoin as Protocol, Union Square Ventures, 5 pgs., Oct. 31, 2013.
https://www.gov.uk/government/news/distributed-ledger-technology-be . . . , Distributed ledger technology: beyond block chain—Press releases—GOV.UK, 2 pgs., first published Jan. 19, 2016.
http://www.beehiveid.com/blog/identity-and-the-blockchain, Identity and the Blockchain, 6 pgs., Aug. 16, 2015 Alex Kilpatrick.
http://www.beehiveid.com/blog/identity-and-the-blockchain, Identity and the Blockchain, key questions, 14 pgs., Dec. 3, 2014 Richard Gendal Brown.
Co-pending U.S. Appl. No. 15/596,028, filed May 15, 2017.
Co-pending U.S. Appl. No. 15/594,750, filed May 15, 2017.
Co-pending U.S. Appl. No. 15/594,786, filed May 15, 2017.
Co-pending U.S. Appl. No. 15/594,861, filed May 15, 2017.
Co-pending U.S. Appl. No. 15/594,826, filed May 15, 2017.
Co-pending U.S. Appl. No. 15/595,818, filed May 15, 2017.

* cited by examiner

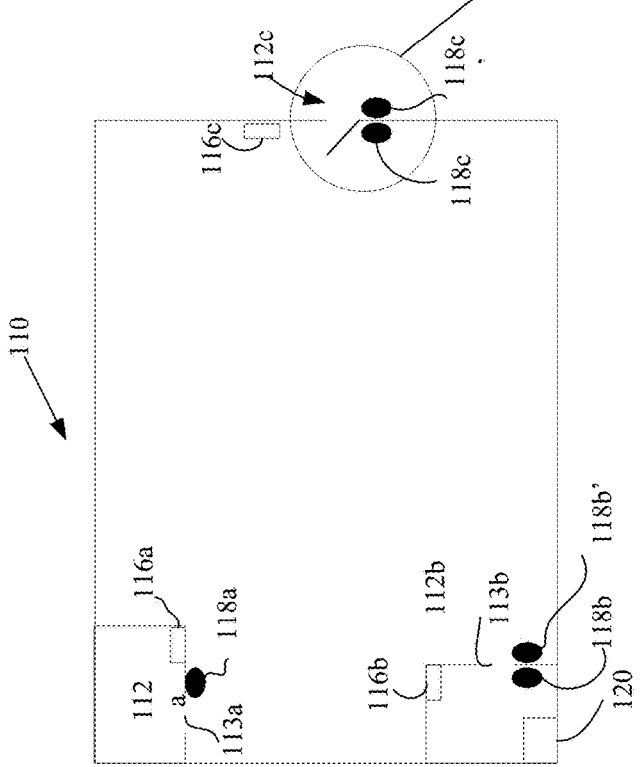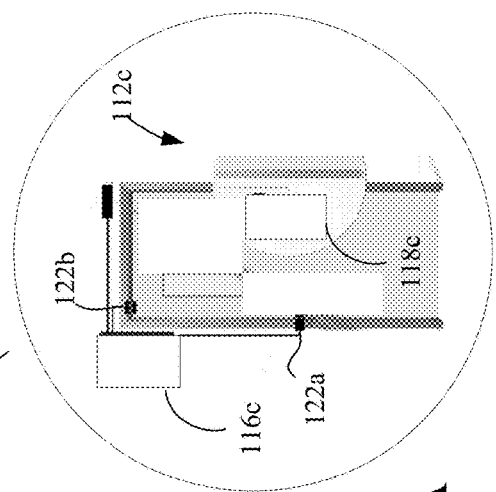

METHOD AND APPARATUS FOR INFORMATION MANAGEMENT

BACKGROUND

This description relates to operation of networks for dissemination of information.

It is common for computer systems to gather information, such as proprietary data on individuals other entities such as businesses etc., as well on operational data from other systems. One type of information is proprietary data such as "personally identifiable information" commonly referred to as "PII." PII is information of a sensitive, personal nature that is generally associated with individuals and is often protected by privacy laws in many jurisdictions. PII is information that can identify or contact or locate a single person or to identify an individual in context. Examples of PII include name, social security number, date and place of birth, mother's maiden name, biometric records and information that is linkable to an individual, such as medical, educational, financial, and employment information, as well as a user's device IP address used in a communication service broker.

Another type of information is proprietary data such as Machine Identifiable Information or "MII," such as in the context of the "Internet of Things." That is, other information that is collected includes operational information such as information used to control access control systems, intrusion detection systems and integrated security/alarm systems. For different reasons each of these types of information may have a sensitive nature that should limit the ubiquitous retention of such information in disparate systems.

Considering PII, modern information technology and the Internet have made it easier to collect PII and MII through various mechanisms leading to various problems such as aiding of criminal acts, identity theft, etc. For example, there have been numerous reports of security breaches of commercial, governmental and private systems having databases storing the PII information of many thousands or millions of individuals.

SUMMARY

Described are computer implemented techniques that provide mechanisms for dissemination between two or more electronic devices of information such as PII (as well as other confidential information) but, in a secure and confidential manner. Also disclosed are mechanisms that allow verification of data that includes PII, without the actual disclosure of that PII. The system places the user in control of what devices/systems can access and what systems can verify the information requested.

According to an aspect, a system comprises one or more user devices that include in the respective devices corresponding identity wallet applications that execute on an electronic processor device of the user devices, and which identity wallets store identity information and encrypt the stored identity information and a network interface device, a distributed ledger system that is a sequential transaction database that comprises plural distributed database systems and network interface device, a broker system that comprises a computer system and network interface device that interfaces to the wallet and the distributed ledger, and a requesting system that comprises a network interface device, wherein the one or more user devices, the distributed ledger system, the broker system and the requesting system are interconnected via an electronic network through respective network interface devices.

Aspects also include systems and methods.

Additional features of the computer program product, systems and methods may include to these and other features.

The service broker system receives encrypted data for transmission to the third party system from the wallet. The service broker system sends to third party systems messages that are listings of verifying systems, upon receiving access requests from the third party systems. The distributed ledger system is a sequential transaction database. The distributed ledger system includes a plurality of distributed databases that comprise storage devices attached to different interconnected computers. The distributed ledger system stores on the plurality of distributed databases an attribute type, a hashed and encrypted value of the attribute, an attester's digital signature of the hashed and encrypted value and the attester's address. The distributed ledger system stores on the plurality of distributed databases an attribute type, a hashed and encrypted value of the attribute, an attester's digital signature of the hashed and encrypted value and the attester's address, with a set of records corresponding to a user's profile that is added to with new records as new attributes of the user are added to the distributed ledger system. The distributed ledger system stores on the plurality of distributed databases attribute types, a hashed and encrypted values of the attributes types, the attester's digital signature of the hashed and encrypted values and the attester's address, with a set of records corresponding to a user's access control profile, and wherein the requesting system is part of an access control system.

One or more of the above aspects may provide one or more of the following advantages. These aspects enable user devices to transmit PII (and other confidential information) without that information being hosted by third party (requesting systems) that would otherwise manage and store such PII (and other confidential information). Such third party requester system are today ubiquitous, making such information vulnerable to improper access and disclosure by employing various types of hacking attacks on any of the ubiquitous numbers of third party requester systems.

Rather than having third party requesting systems having such PII information stored and managed by such third party systems, and thus be subject to compromise, one or more of the above aspects allows the user to be in control of the user's PII (or other confidential) information, and secure exchange thereof, while also providing a mechanism for systems that do not actually need specific PII information, but merely need to verify some criterion, to know that the criterion sent to the requesting system by a user was valid.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 9 is a block diagram of a facility with access control.

FIG. 9A is a blown up view of a portion of FIG. 9.

DETAILED DESCRIPTION

Described herein is a set of techniques that provide a solution using a private service broker for dissemination between two or more electronic devices of information such as PII (as well as other confidential information), which dissemination occurs in a secure and confidential manner. Also described is a mechanism that allows for the verification of information including PII (as well as other confidential information), without the actual disclosure of the PII (as well as other confidential information). The system described uses a combination of an identity wallet that executes on a user device, a distributed ledger that manages proxies for PII (as well as other confidential information), along with a service broker system that securely manages data transmissions and verifications of the data without actually having the wallet directly access the distributed ledger.

Figure 1:
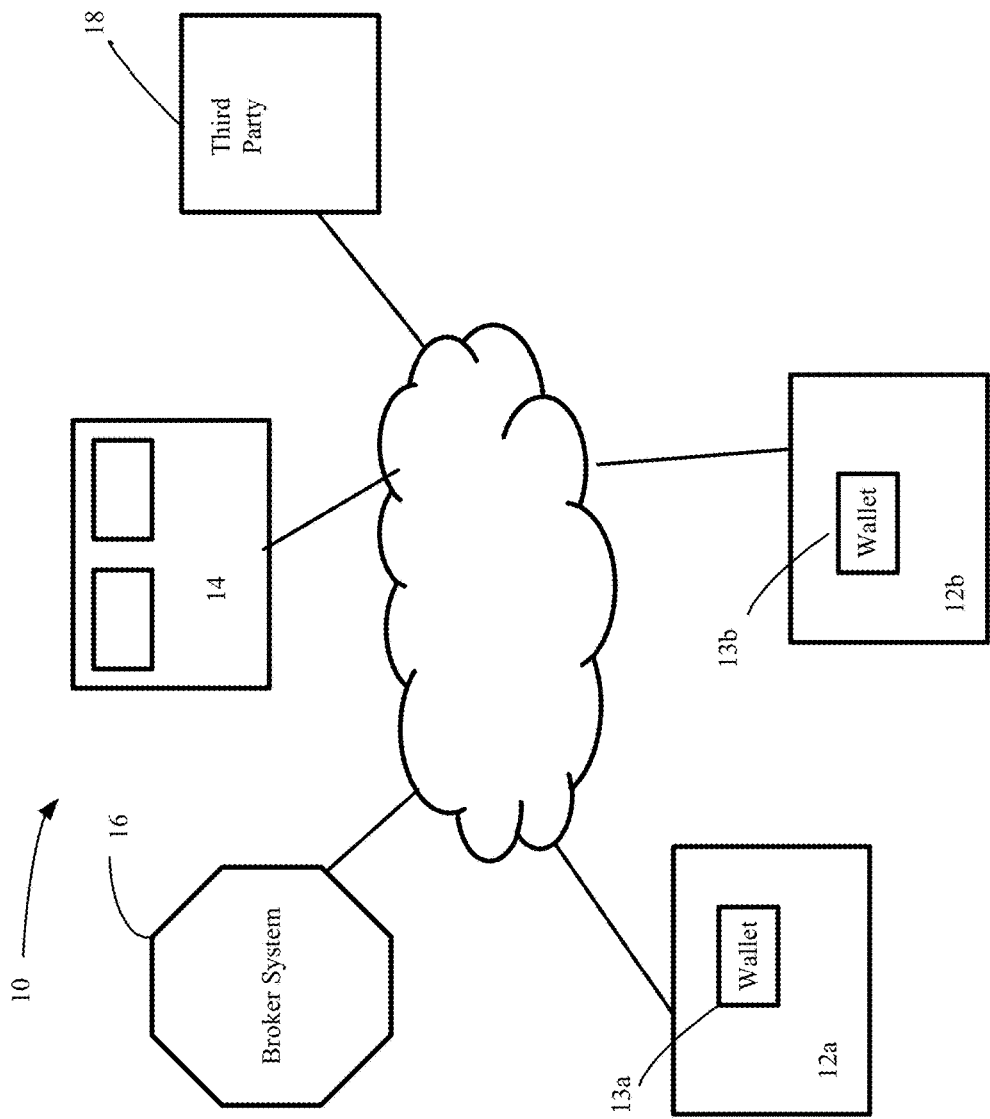
FIG. 1 is a schematic diagram of an exemplary system for securing PII information.

Referring now to FIG. 1, an exemplary distributed network system 10 is shown including user devices 12a, 12b, here wireless enabled user mobile devices, such as smartphones, which house respective identity wallets 13a, 13b. The term "smartphone" is used to describe a mobile phone device that executes an advanced mobile operating system. The smartphone has hardware and a mobile operating system with features of personal computer hardware and operating systems along with features required for mobile or handheld operation, such as those functions needed for use of the smartphone as a cell phone and includes GPS (global position system) navigation. The smartphone executes applications (apps) such as a media player, as well as browsers, and other apps. Smartphones typically can access the Internet and have a touchscreen user interface. Other types of user devices could be used including personal computers, tablet computers, as well as, systems that are involved with exchange of sensitive data, such as access control systems and intrusion detection systems. Other form factors can be used to house the identity wallet 13a, such as wearables and biometrics.

For illustrative purposes, the discussion will focus on the user devices 12a, 12b as being smartphones. Included in the smartphones of FIG. 1 are the identity wallets 13a, 13b respectively. As used herein a wallet is an application that executes on an electronic device, such as the user devices 12a, 12b, and which allows a user of the device to store identity information, encrypt such identity information and communicate with a broker system. Wallets 12a, 12b are also used to authenticate credentials of the holder of the particular wallet, as well as other wallets. For example, a wallet could be used to verify the age of a buyer to a store while purchasing alcohol. The term "wallet" actually refers to a complication of three major systems, an electronic infrastructure, an application that operates with the system and the device (e.g., smartphone). In the discussion below, the holder's proprietary data is associated with the wallet. For example, a bank account can be linked to the wallet, as well as the holder's information such as driver's license, health records, health care, loyalty card(s) and other ID documents stored on the phone. Also, in the discussion below, the focus will be on user device 12a and wallet 13a.

The system 10 also includes a distributed ledger system 14 that is a sequential transaction database. An example of such a sequential transaction database is the so-called "Blockchain" that operates with cryptocurrencies, such as "bitcoin" ® (bitcoin project.org). The distributed ledger manages the PII transactional records (or other sensitive information). While sharing some similarities to the Blockchain as well as other known types of sequential transaction databases, the distributed ledger 14 has some significant differences. Accordingly, the distributed ledger 14 has a structure as set out in FIG. 2, as will be discussed below.

The system 10 also includes a service broker system 16 that is a third party service system that interfaces between the wallet 13a and the distributed ledger 14. The service broker system 16 receives encrypted PII data for transmission to a third party system, as well as sending to third party systems listing of verifying systems, upon receiving access requests from the third party system. As used herein, the service broker includes a hardware platform. For example, with a self-contained enterprise example, the Service Broker would include a hardware platform (e.g., a server computer system), a server operating system and a "calculator/attester algorithm" (discussed below). The "calculator/attester algorithm" would broker between the source and target peer-to-peer entities such that a minimal amount of information required to legitimize and execute an information exchange between the source and target is determined, exchanged, and validated so that a "transaction" can occur. The record of the transaction is written into the distributed ledger 14 with the minimum amount of PII or MII information, if any, including any metadata regarding the transaction or the information.

Unlike the "exchange" concept in "bitcoin" where the bitcoin exchanges, facilitate the buying and selling of bitcoins for fiat money, and may be required by law to collect personal information, the described service broker system 16 is interposed between transactions, in contrast to "exchange" in bitcoin. As such, service broker system 16 interfaces between the identity wallet 13a and the distributed ledger 14 and has, whereas the exchange interfaces between itself and the wallet or itself and the Blockchain.

The system 10 also includes a third party system 18. The third party system 18 can be any electronic system (or device) and is the system/device that seeks some aspect of the PII or other confidential information of a user or held by the user device 12a, associated with the user.

In the use cases discussed below, some or all of the aforementioned user device 12a, wallet 13a, distributed ledger 14, service broker 16 and third party system 18 are used. In addition, in some implementations, there can be several service broker systems used.

Figure 2:
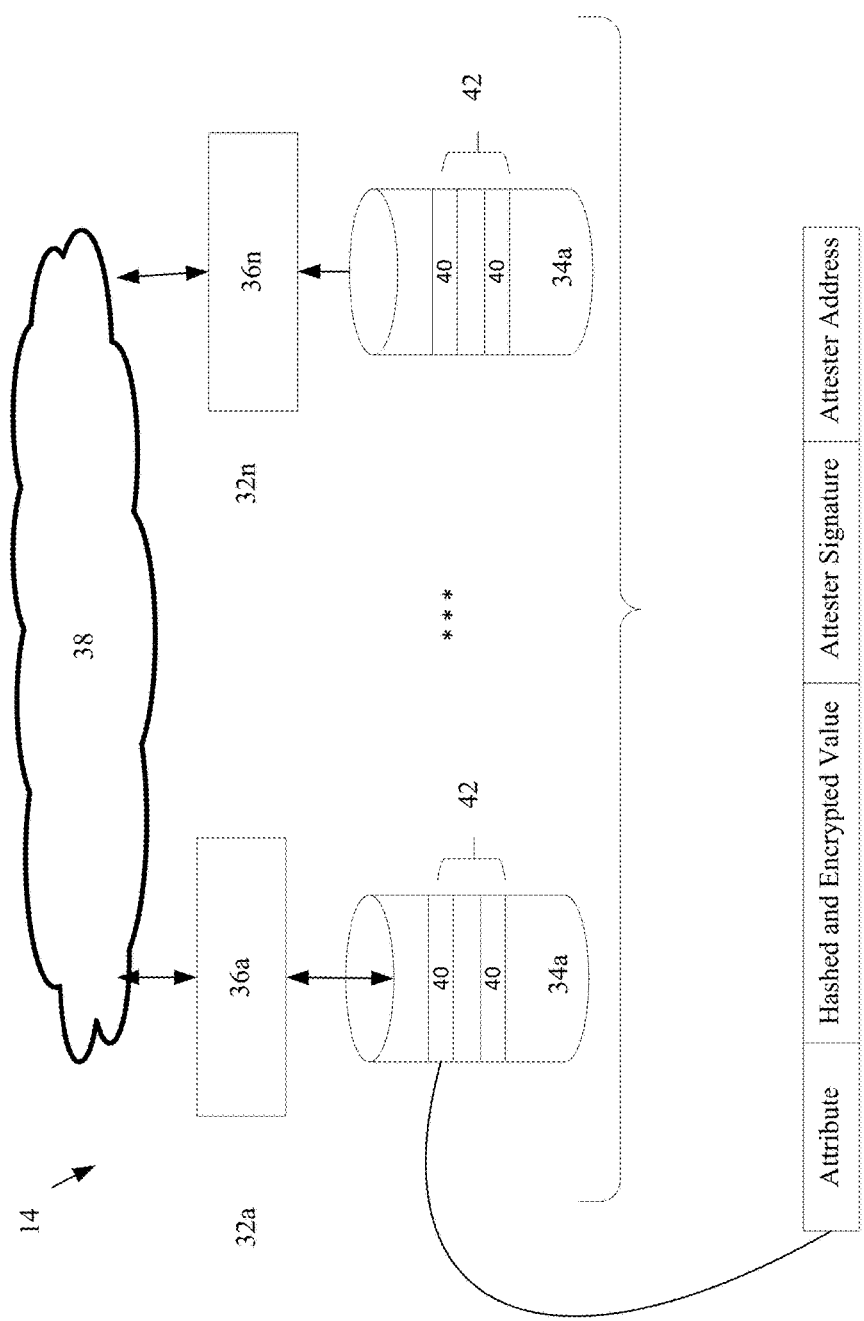
FIG. 2 is a block diagram of a distributed ledger.

Referring now to FIG. 2, the distributed ledger system 14 is shown. As mentioned, the distributed ledger system 14 is a sequential transaction database. The distributed ledger system 14 thus includes distributed databases 32a-32n that are typically existing in the "Cloud." The distributed database comprise storage devices 34a-34n that are attached to different interconnected computers 36a-36n. The distributed databases are controlled by a distributed database management system that controls storage of data over a network 38 of the interconnected computers and execute corresponding replication and duplication processes. Replication software (not shown) detects changes in the distributed database contents and once the changes have been detected, replicates the changes to have all the databases the same. Duplication software (not shown) identifies one database (not shown) as a master and then duplicates that database across other databases. Replication and duplication keep the data current in all distributed storage locations.

Each of the distributed databases 32a-32n that form the distributed ledger system 14 store encrypted information records. An exemplary record 40 is shown below. The record 40 is stored in each of the distributed databases 32a-32n that form the distributed ledger system 14, which stores the record 40 in an encrypted form in the distributed ledger system 14. Record 40 has a structure that includes an attribute type, a hashed and encrypted value of the attribute, an attester's digital signature of the hashed and encrypted value and the attester's address. An exemplary record format is set out in table below.

| User Attribute | Hashed and Encrypted Value | Attester Signature | Attester Address |
|---|---|---|---|
| Attribute | encrypt (attribute) | Signature of encrypt (value) | Address |

An exemplary set of records is set out in table below. A set 42 of such records 40 can correspond to a user's profile. This set 42 (or profile) is added to with new records as new attributes of the user are added to the distributed ledger system 14.

| User Attribute | Hashed and Encrypted Value | Attester Signature | Attester Address |
|---|---|---|---|
| Citizenship | encrypt (USA) | Signature of encrypt (USA) | attst@cadmv.com |
| Current Age | encrypt (age) | Signature of encrypt (age) | attst@cadmv.com |
| Home Address | encrypt (address) | Signature of encrypt (address) | attst@cadmv.com |
| Height | encrypt (height) | Signature of encrypt (height) | attst@cadmv.com |
| Access credentials | encrypt (credentials) | Signature of encrypt (credentials) | secure@serv.com |
| * | * | * | * |
| * | * | * | * |
| * | * | * | * |

One can readily observe that what is stored in the distributed ledger system 14 is information about a user's attribute, a hash of that attribute, information about an attester to the attribute, which information is attester signature system, and attester address. The attester when contacted can attest to the requested information being valid. For example, given a user's birth certificate that is issued by a state governmental agency that state governmental agency converts the birth certificate to a digital file of the document, and that digitized file of the document is hashed to provide a hash of the digitized birth certificate document. Rather than the document itself being stored (or the digitized document being stored, what is stored is the hash of the digitized birth certificate document, that is stored in a user's profile in the distributed ledger 14.

When a third part system 18 seeks the birth certificate of the user, the user system/device 12a sends the requesting system 18 the actual birth certificate. In this case the actual birth certificate is sent. The receiving party generates the hash of the birth certificate and validates that the hash of that birth certificate exists in the distributed ledger 14. As, the requesting system 18 generates the hash of that document, e.g., the birth certificate, and accesses the hash from the distributed ledger 14, and while the system can send that hash back to the government system to verify that the hash is of the user's birth certificate, with the present embodiment, the requesting system 18 need not go back to the government system to verify. Rather, the requesting system 18 needed only retrieve from the distributed ledger system 14, the signature for the entity that signed that hash. The distributed ledger system 14 stores the "Attester Signature and the "Attester Address." The requesting system determines whether the stored "Attester Signature and the "Attester Address" can be trusted. If the requesting system determines that the Attester is trusted, the requesting system can verify the document was signed by the Attester, and is assured that hash of the document received by the requesting system from the wallet is authentic, as the same document attested to by the Attester.

Within a domain, distributed ledgers exchange information to maintain identical ledgers, with any suitable so called sequential transaction database technology of "Blockchain" technology is but one example. However, unlike some electronic currency based technologies, e.g., bitcoin, where the Blockchain is designed so that no entity controls the Blockchain in some examples disclosed herein using the techniques disclosed herein the transaction database technology actually exchanges information within a domain and because such domains could be private transaction databases, each entity or industry could structure the transaction database as different private transaction databases.

Figure 3:
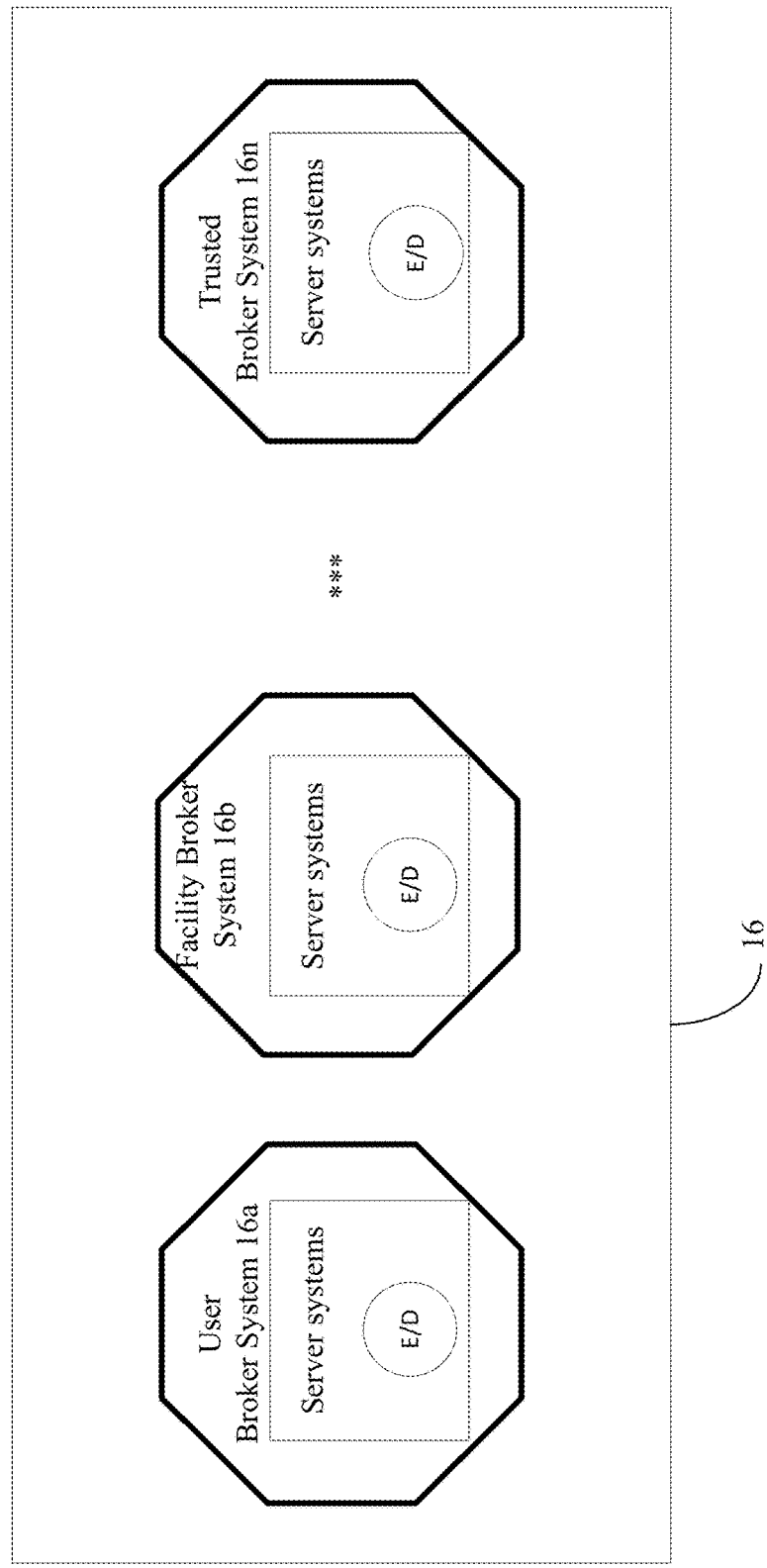
FIG. 3 is a block diagram of a broker system.

Referring now to FIG. 3, the broker system 16 is shown. The broker system 16 includes a computer system and executes software that handshakes between the user system 12 and the vetting agent or attester. Rather, than the user device 12a accessing the distributed ledger 14, all requests for transactions between the user device and the requesting device occur through the broker system 16. For some transactions, the broker system 16 accesses the distributed ledger system 16, whereas in other transactions the requesting system 18 accesses the distributed ledger system 16. As shown in FIG. 3, the broker system 16 can be a compilation of many such broker systems 16a-16n. Each of the broker systems 16a-16n can comprise computer systems and associated distributed databases. The broker systems 16a-16n are distributed over a network of servers that act together to manage the distributed ledger 14. All attribute hashed values, attester information, etc. are stored in the distributed ledger 14 and as the flow diagram below will show the broker systems 16a-n are configured to access the distributed ledger 14 to obtain and validate information. Also shown in FIG. 3, are the encryption and decryption (E/D) of data flows that take place between the broker systems 16a-n and wallets 13a.

Note that in the context of a private distributed ledger environment, for an enterprise, it may be desirable to not have a query sent to the attester database for each transaction. Rather, a business rule could be established that once a validation event has occurred, then it is good for a period of time, until the attester database is updated etc., so as to reduce latency.

Figure 4:
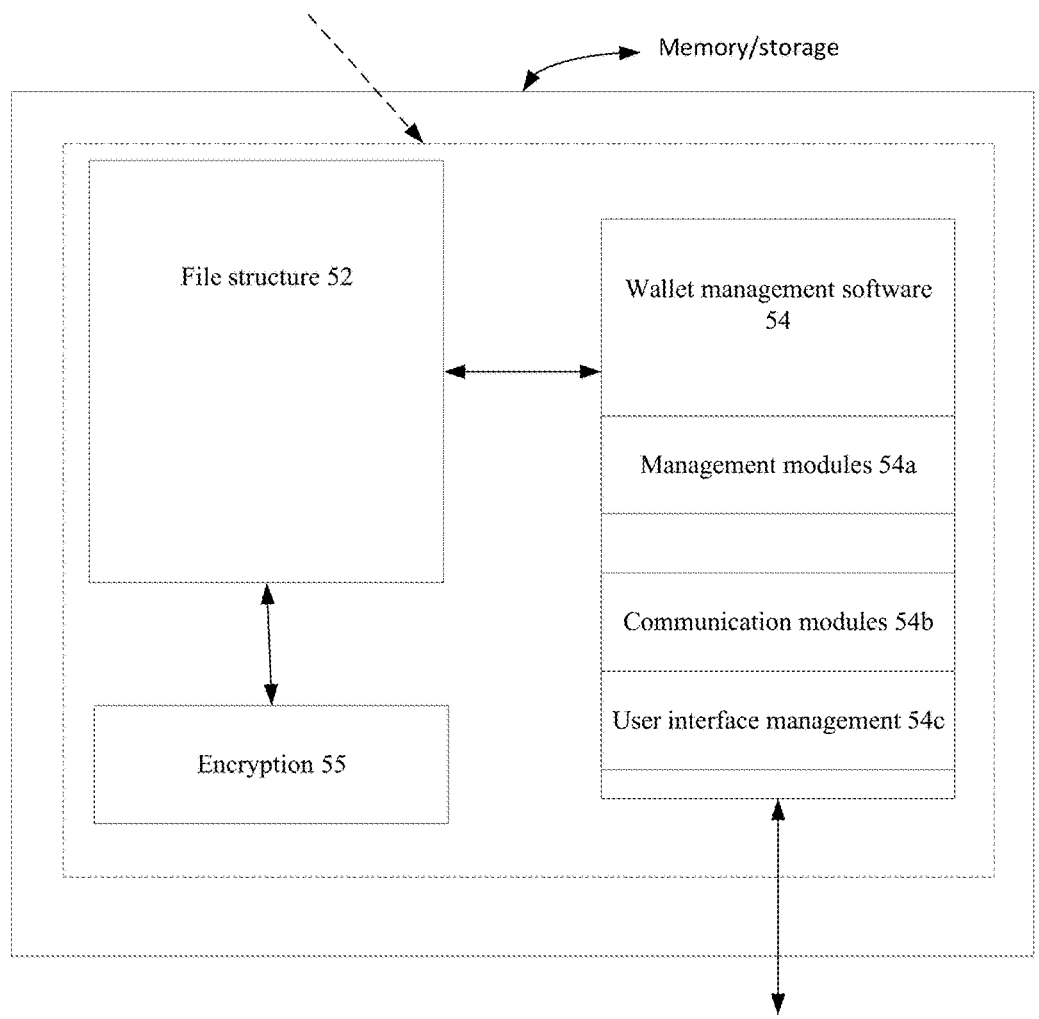
FIG. 4 is a block diagram of an identity wallet.

Referring now to FIG. 4, the wallet 13a is shown. The wallet 13a include a file 52 structure and wallet management software 54 that is stored on a user device 12a (FIG. 1). In addition to the software comprising management modules 54a that handle request and access to the file structure, as well as receiving user authorizations, etc., the software also includes communication modules 54b that can exchange information between the wallet and requestor systems, and between the wallet and the broker system 16 and that receives requests for information that result in messages being displayed on the user device.

The wallet 13a stores information for handling of a third party request for data directly from a user that transmits that information directly from the wallet to the third party system in a secure manner. The Identity Wallet may take several form factors—a physical ID Wallet such as a credit card, smart wearable etc. or it may only need to be the software payload that a system pushes out to a commercially acceptable mobile device such as a smart phone.

The wallet has the management module 54a that handles third party requests for information and/or attributes and the communication module 54b that interfaces with the broker system 16. The wallet includes a module 54c that allows a user to view the request and either approve, all or part of none of the request. Upon approval (partial or all) of the request, the wallet encrypts via encryption module 55 the requested information using a public key infrastructure (PKI) where a public key of the third party is used along with one the private keys associated with the wallet 13a to encrypt the data. The encrypted data can either be sent to the user's broker system 16 or the wallet 13a can look up the direct address of the third party system 18 and send the encrypted data directly to the third party system 18. As known, a public key infrastructure (PKI) is a set of hardware, software, people, policies, and procedures needed to create, manage, distribute, use, store, and revoke digital certificates and manage public-key encryption. The purpose of a PKI is to facilitate the secure electronic transfer of information for a range of network activities such as e-commerce, internet banking and confidential email. PKI is required for activities where simple passwords are an inadequate authentication method. In cryptography, PKI binds public keys with respective user identities by means of a certificate authority (CA) within a CA domain. The user identity is unique within each CA domain.

Figure 5:
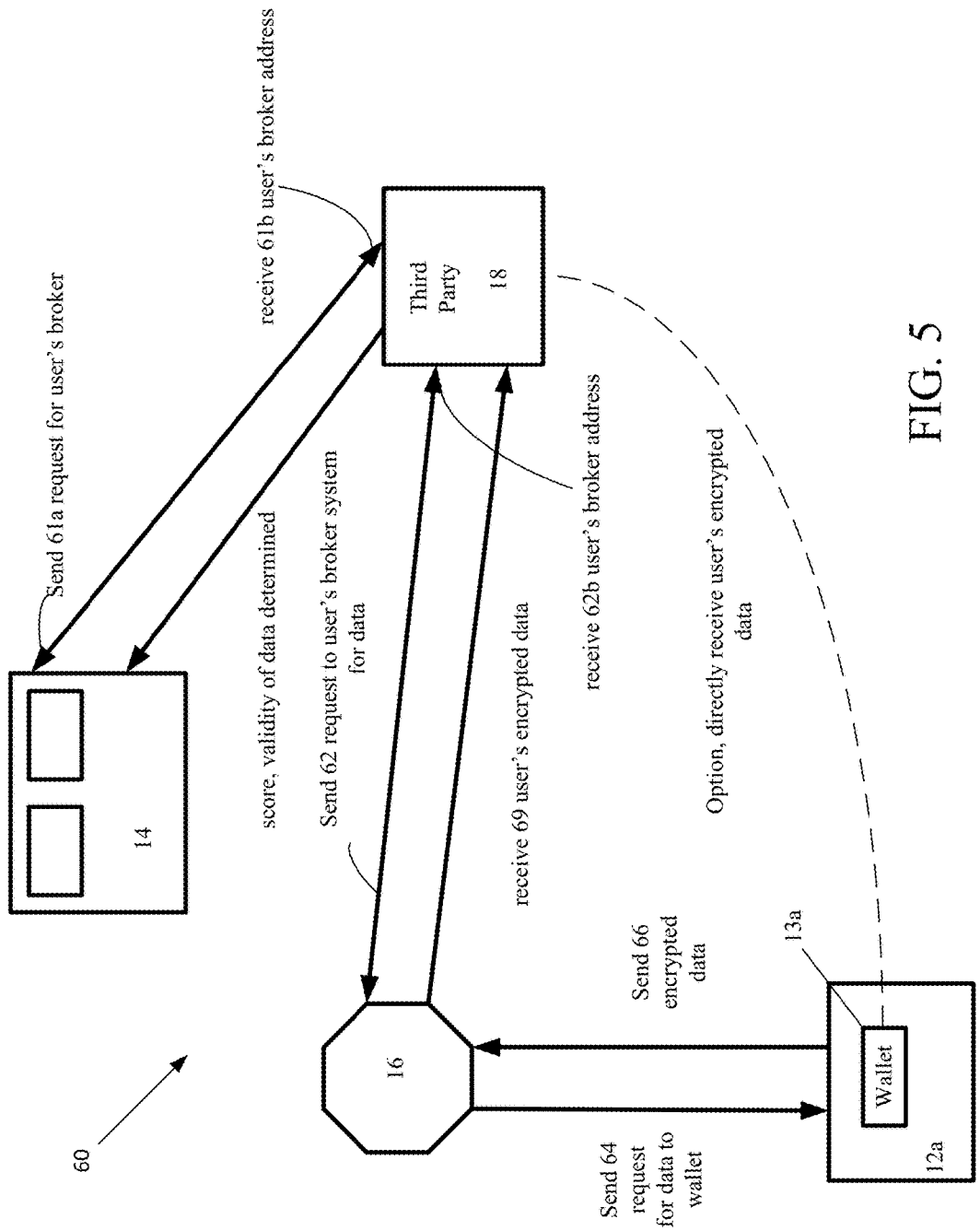
FIG. 5 is a block diagram for a first use case.

Referring now to FIG. 5, a diagram of a use case 60 and flow for the use case 60 where the third party system 18 requests information from the user system 12a is shown. In this case, the broker system 16 provides an asynchronous transfer between the user device 12a and the third party device 18. The third party device 18 sends a message request 61a to the distributed ledger 14 for the user's broker system. In general, there can be many such broker systems associated with many users. The third party device 18 receives 61b a message that includes an address of the user's determined broker, as received from the distributed ledger. (In the following figures, as needed, double arrowed lines and reference characters on tips of such arrows are used to denote paired messages, such as sending and receiving messages.) In other implementations, the address lookup can also go through the exchange network.

The third party device 18 sends 62 a message to the user's determined broker 16, which message includes a request to access data on the user's wallet 13a. The request for data is sent 64 from the broker system 14. A "score" is calculated for determining the validity of the data (rather than being a measure of the secure transmission of the data). When checking to see how valid data are a scoring algorithm is applied, and which algorithm can be based on the number and types of attesters, etc., to the user's wallet 13a on device 12a. Various algorithms can be used such as one that weights types of attesters and number of attesters and normalized these to a standard. Thus, a score generated with a large number of highly trusted attesters would be higher than a score generated with a large number of attesters having a low level of trust. An alternative to this type of score is an attester score based on the type of attester and how trustworthy the attester is and has been.

| Score | Number of attesters of high trust | Number of attesters of moderate trust | Number of attesters of low trust |
|---|---|---|---|
| 0-10 | 0 | 0 | No more than X |
| 11-20 | 0 | 0 | Greater than X less than Y |
| 21-40 | 0 | At least M | |
| * | * | * | * |
| * | * | * | * |
| * | * | * | * |
| 91-100 | At least Z | | |

One algorithm, as in the table above, is a mapping scheme that maps a score range (or values) to various slots based on empirically determined number of attesters (M, X, Y, Z) and empirically determined trust levels (high, moderate, low). This could be an example of a score for an item. Thus, with an item could be stored the number of and types of attesters of various categories (three of which, low, moderate and high trust levels being shown) or the score range or value.

Other scoring algorithms such as weighted algorithms could be used, such as one of the form:

Score=$((H*W_h+M*W_m+L*W_h)$/total)/Normalized

Where H is the total of high trusted attesters
M is the total of moderately trusted attesters
L is the total of low trusted attesters
$W_h$; $W_m$; $W_h$ are empirically determined weights, and
Normalized is an optional normalization function or value.

The user's wallet 13a (or other application or user via a physical action using a user input device) either answers (yes or no) or simply ignores the message. When the answer is yes, the user's wallet 13a (or other application) encrypts the data using an asymmetric encryption algorithm that uses the requestor's public key. The encrypted data is sent 66 from the user's wallet 13a to the broker system 16 so that only the two endpoints (user's wallet 13a and the third party system 18) can read the actual data. At the broker 16 system, upon reception of the encrypted data from the user's wallet 18a, the broker system 16 sends the data to the third party system 18. In another implementation, the data would be sent directly to the requestor's wallet without the intermediate broker.

Figure 6:
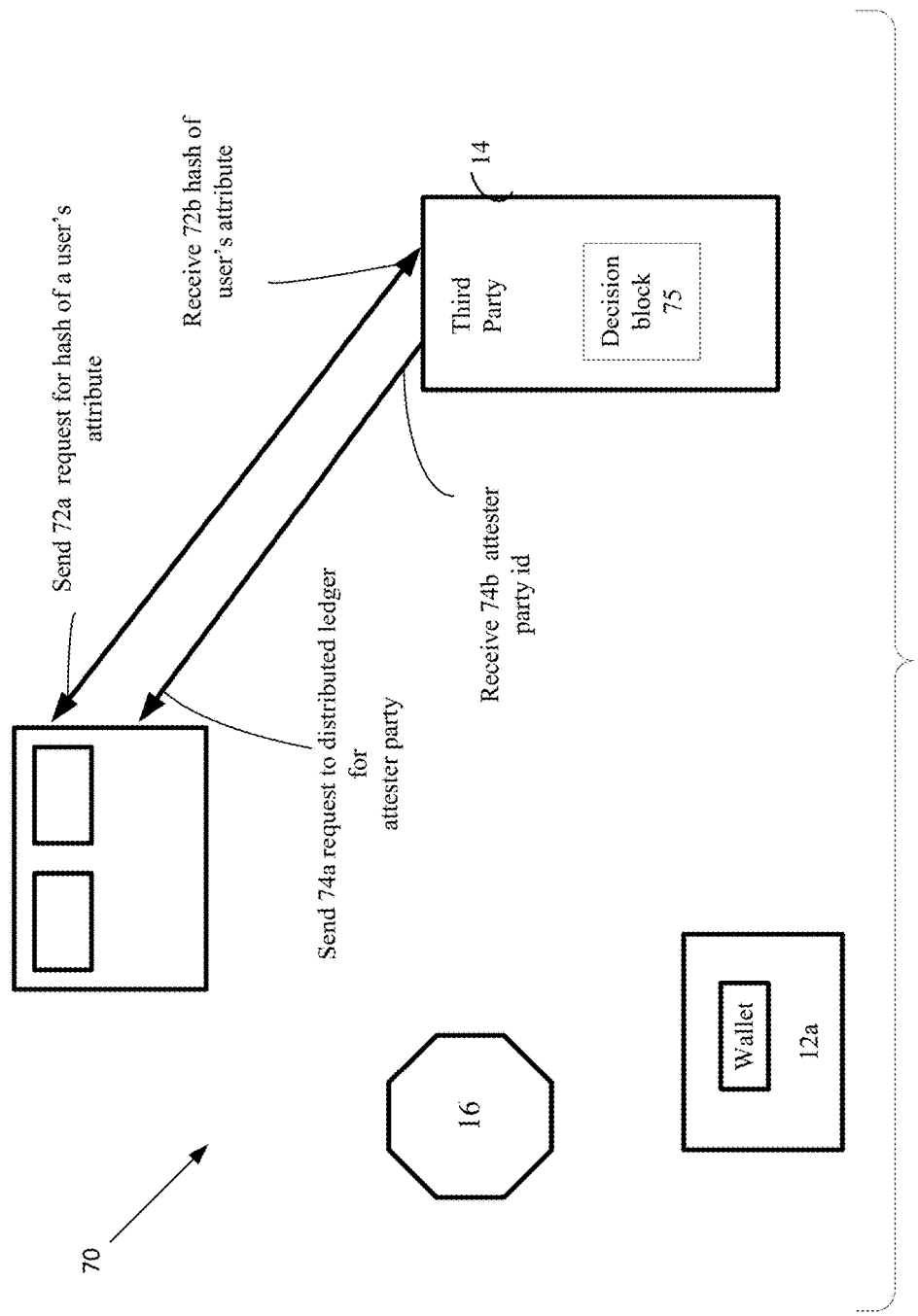
FIG. 6 is a block diagram for another use case.

Referring now to FIG. 6, another use case 70 is shown in which there is a required validation of PII data (or other data) through a distributed public ledger 14a. The distributed ledgers can be public, meaning that anyone can place and/or access data in the ledger or private, meaning that only authorized individuals and entities can place and/or access the private type of ledger. Thus, generically, such distributed ledgers 14 can be public or private depending on various considerations. In either instance, the ledger 14 contains the information needed to validate the brokered information. The third party system 18 sends 72 a lookup request to the distributed ledger 14a for a particular user's attribute.

In FIG. 6, the broker 16 and wallet 13a and user device 12a are not directly involved, but are shown. The lookup request is actually for a hash of the desired user's attribute. The distributed public ledger 14a receives the request and accesses the hash of the particular user's attribute and returns 72b that hash to the third party system 18. The third party system 18 sends 74a a look up message request for the system that has attested to the hash of the particular user's attribute stored in the distributed public ledger 14a. The third party system 18 receives 74b the identity of the system that performed the attestation to the hash of the particular user's attribute, and makes an independent decision 75 on the validity of the hash of the particular user's attribute. For cases where privacy of the data is a concern this case assumes that the third party system has the user's public key, as the attribute data is encrypted. For other types of data where privacy of the data is not a concern, the attribute need not be encrypted.

Note in addition to returning the attester information, the system could return the attester score of that attester having the highest score. The score could be calculated by the distributed ledger 14, but may be more appropriately calculated by the broker system.

Figure 7:
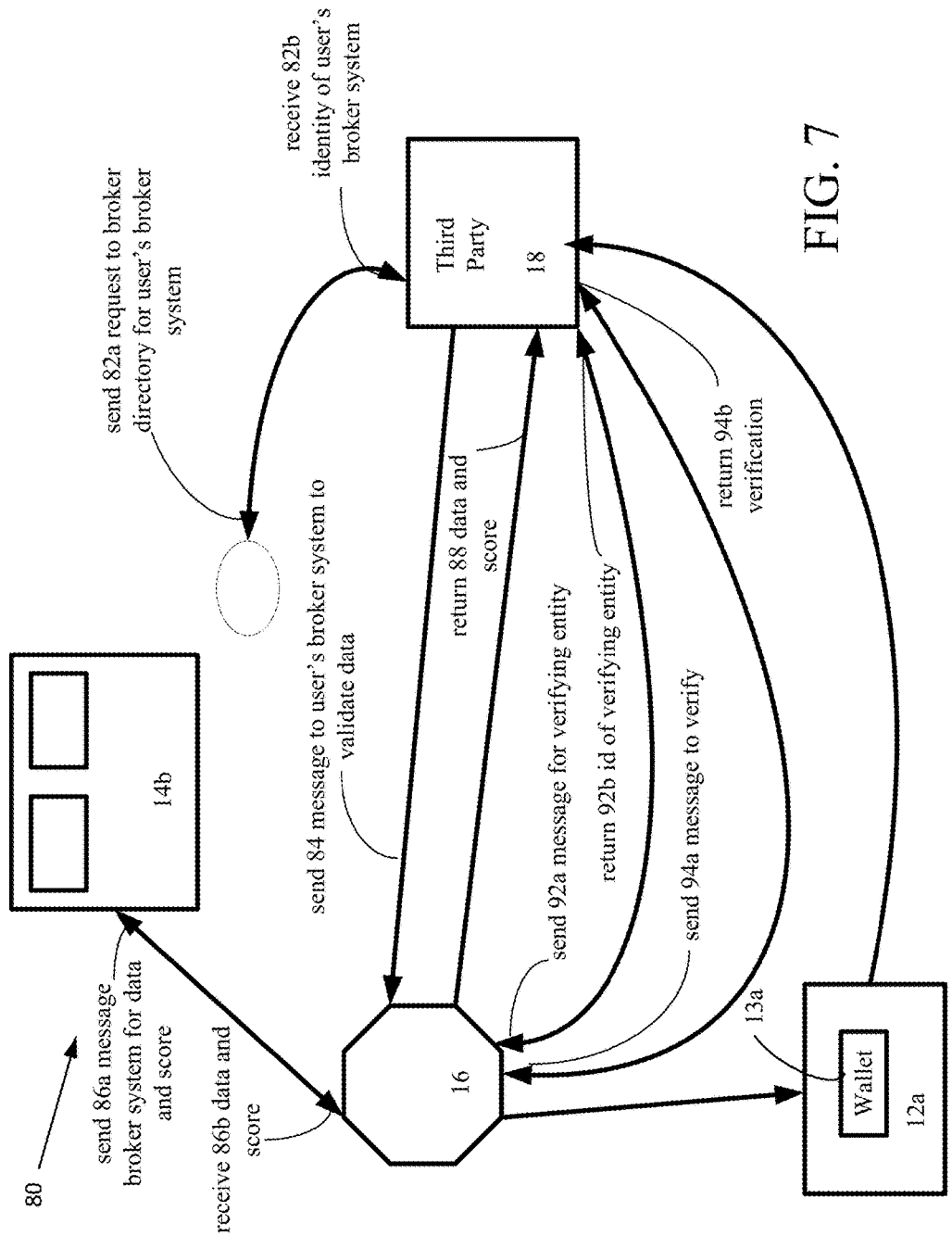
FIG. 7 a block diagram for still another use case.

Referring now to FIG. 7, another use case 80 is shown in which there is required validation of data through a private distributed ledger 14b. The third party system 18 sends 82a a message to a broker directory system 15 to locate the user's broker system. The broker directory system 17 determines the user's broker system and sends 82b a message to the third party system 18, which includes the identity of the user's broker system. The third party system 18 sends 84 a message to the determined user's broker system 16, which is a request to the user's broker system 16 to validate data and return score data. There are many algorithms that could be used for scoring. For example, a simple algorithm may assign a score to an attester as high, when the attester is a governmental agency and may score an attester as lower when the attester is a personal contact. The user's broker system 16 validates data by sending 86a a message to the distributed ledger 14b for the data and the score (of the data or the attester). The broker receives 86b from the distributed ledger 14b a message including the data and the score(s). The user's broker system 16 returns 88 the score(s) and status back to the third party system 18.

One approach for a private enterprise would be for an enterprise to define business rules that govern source attester scores. The rules could be absolutes. Alternatively, over time the system that determines the score builds "a transactional footprint" for transactions, which is based on physical access points, logical access points, time of day, duration of use, etc. used with a transaction record. Initial algorithms are determined at the initial deployment, and then are refined based upon a regression pattern(s) that emerges.

Optionally, the third party system 18 requests 92a a lookup of the broker/owner for the party that verified the data. The third party receives 92b the address of the broker/owner that verifies the data. The broker/owner system that verifies the data signs the data with its digital signature. The broker/owner system sends 94a a message to the verifying broker/owner to verify a signature of the signed data. Upon receiving 94b a verification from the verifying broker/owner system, the third party system has verification of the data without actually having accessed the data. Optionally, the user can share 96 the data to be validated with the third party directly from the user's wallet.

Figure 8:
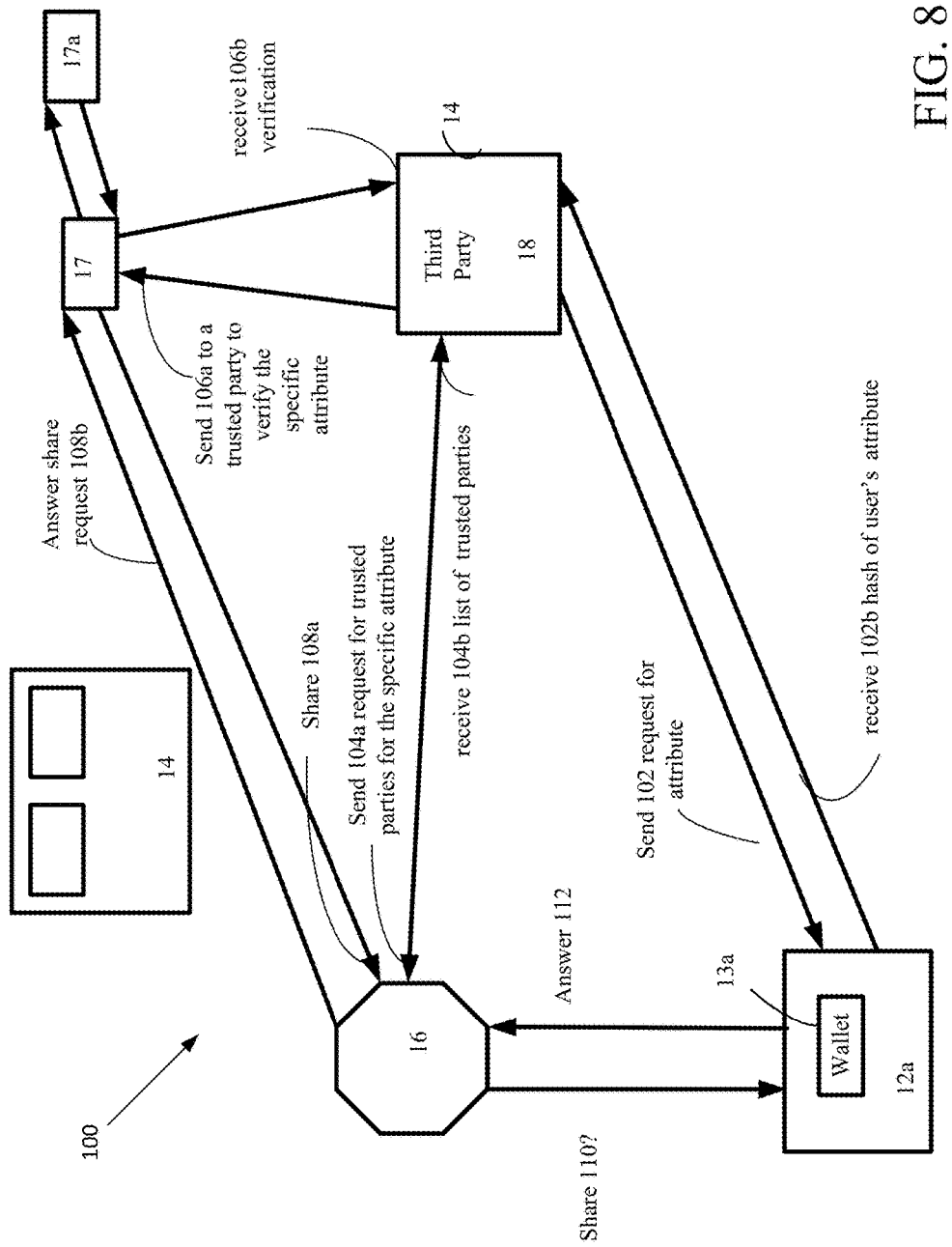
FIG. 8 is a block diagram for still another use case.

Referring now to FIG. 8, another use case 100 in which a third party requests validation of an attribute without actually disclosing the attribute is shown. This use case 100 can be used, for example, to show that a person is at least of a particular age without actually disclosing the age. For instance, the case 100 can be used to verify that an individual is over the age of 21 without disclosing the actual age of the individual to the third party system 18. The third party system 18 sends 102 a request for a desired attribute to be verified, in this example age, to the wallet 13a.

In this use case the wallet 13a does not send the hash of the age, it does allow the 3rd party to request age from the exchange but it does not send any hash or information. Ideally the rule is submitted to the exchange of the user (i.e. the request would be to validate if age is over 21). The user would authorize the exchange for this rule to be processed. The DMV would verify that the rule was authorized by the user through the exchange before processing actually occurs.

For example, for the attribute user's age, the trusted party that attested to the user's age could be the user's Department of Motor Vehicle (DMV) registry, which registry has systems that store users' ages of various users. The third party system receives 104b a list of one or more trusted parties, determines which of the trusted parties it wants to use to verify the user's attribute, and sends the requested rule, i.e., is age over 21. The DMV could verify that this rule was authorized by the information owner and if answering the rule was authorized, the DMV broker processes the rule and sends the response. That broker system 17 will, in turn, access a database 17a get obtain the hash of the user's age. The broker system 17 will send a message that asks 108a the broker system 16 if the user's info can be shared with the third party 18. The broker system will send 110 a message to the user's wallet asking if the DMV should notify the third party of the user's age. If an answer is received 112 by the broker indicating that validation is authorized, this message will be passed from the broker 16 back to the broker 17 and the broker 17 will have validated whether or not the user's age is as requested by the third party.

Referring now to FIGS. 9, 9A, an alternative implementation is shown in the context of an access control system. A facility 110 with access control is shown. In this illustrative example, the facility 110 includes two secured rooms 112a and 112b and a single external entryway 112c. Room 112a has a doorway 113a and has associated therein an access controller 116a and an ingress card reader 118a. Room 112b has a doorway 113b and has associated therein an access controller 116b and two card readers, an ingress card reader 118b and an egress card reader 118b'. The external entryway 12c has associated therewith an access controller 116c and two card readers, an ingress card reader 118c and an egress card reader 118c'. A detailed view of the external doorway is shown in FIG. 9A with exemplary door locks 122a, 122b controlled by the access controller 116c.

Figure 10:
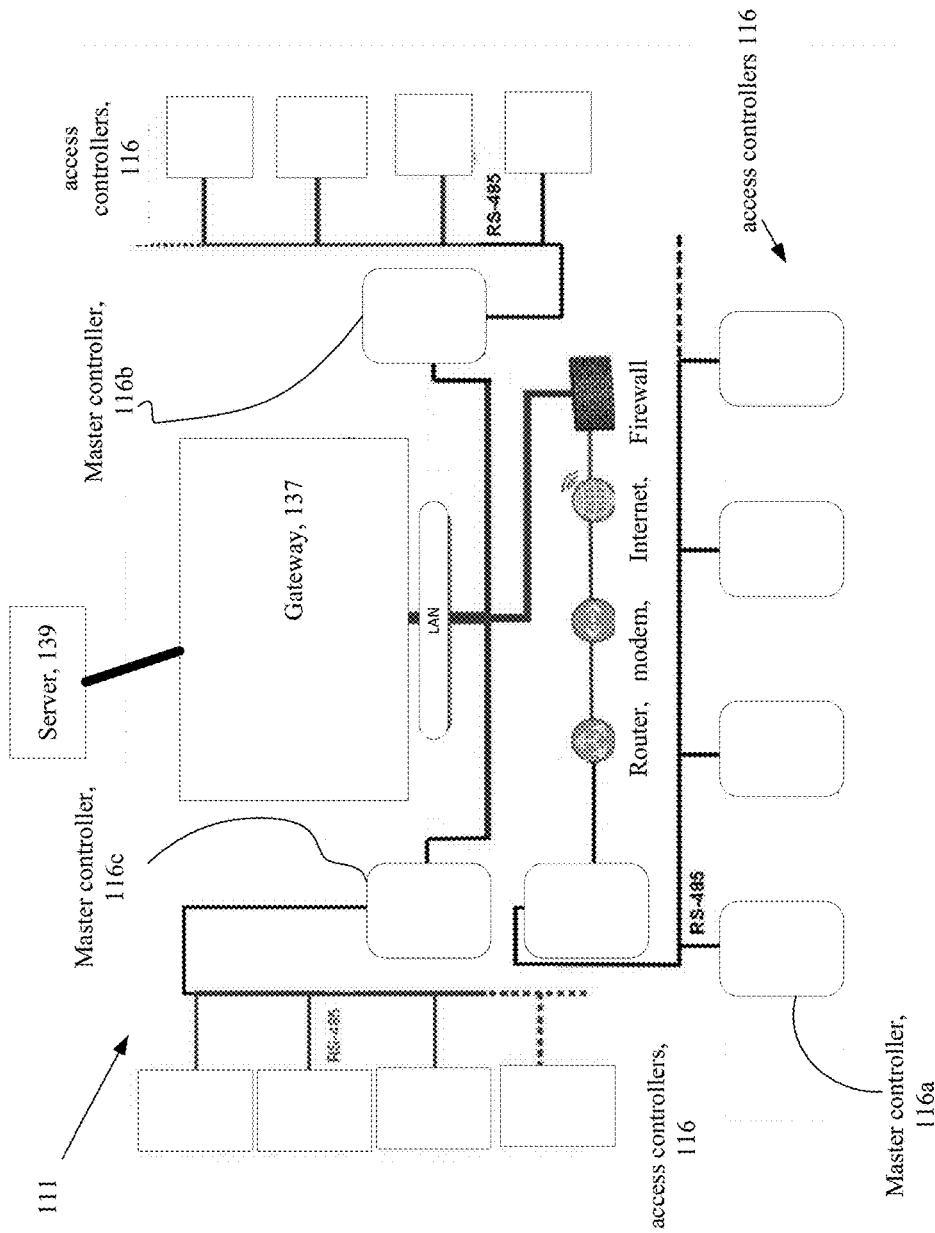
FIG. 10 is a block diagram of an example of an access control system.

Referring now to FIG. 10, access control system 111 for a typically facility 110 includes a plurality of access controllers generally 116. Each of the access controllers 116 can have designated master controllers (not shown). Conventional techniques to set up and associate these controllers with a security system can be used. During installation of an access control system, the access control system is configured by a technician according to operational requirements of the facility 110. The system also includes a gateway 137 that is coupled to the access controllers, e.g., via master controllers 116a-16c and a LAN, router, modem, to access the Internet and a firewall, as illustrated, and a server 139 that is coupled to the gateway 137. This is but an illustrative example.

The techniques disclosed herein converge physical security, logical security, and cyber security. A user desires access to a facility and to access a network. Every time a user requests access whether it is to open a physical door or log on to a network the system 10 is used manage and control dissemination of PII information and avoid the replication and duplication of such PII information. By use of the wallet as "an identity wallet," that could take on various physical forms such as a card, ring on a finger, a user device, the identity wallet contains attribute data associated with the user. In a private enterprise environment that is a self-contained enterprise a private distributed ledger 14 will be provided within that environment to allow the user to unlock and lock doors log onto networks etc. by the wallet and the broker exchanging messages similar to those discussed above.

Figure 11:
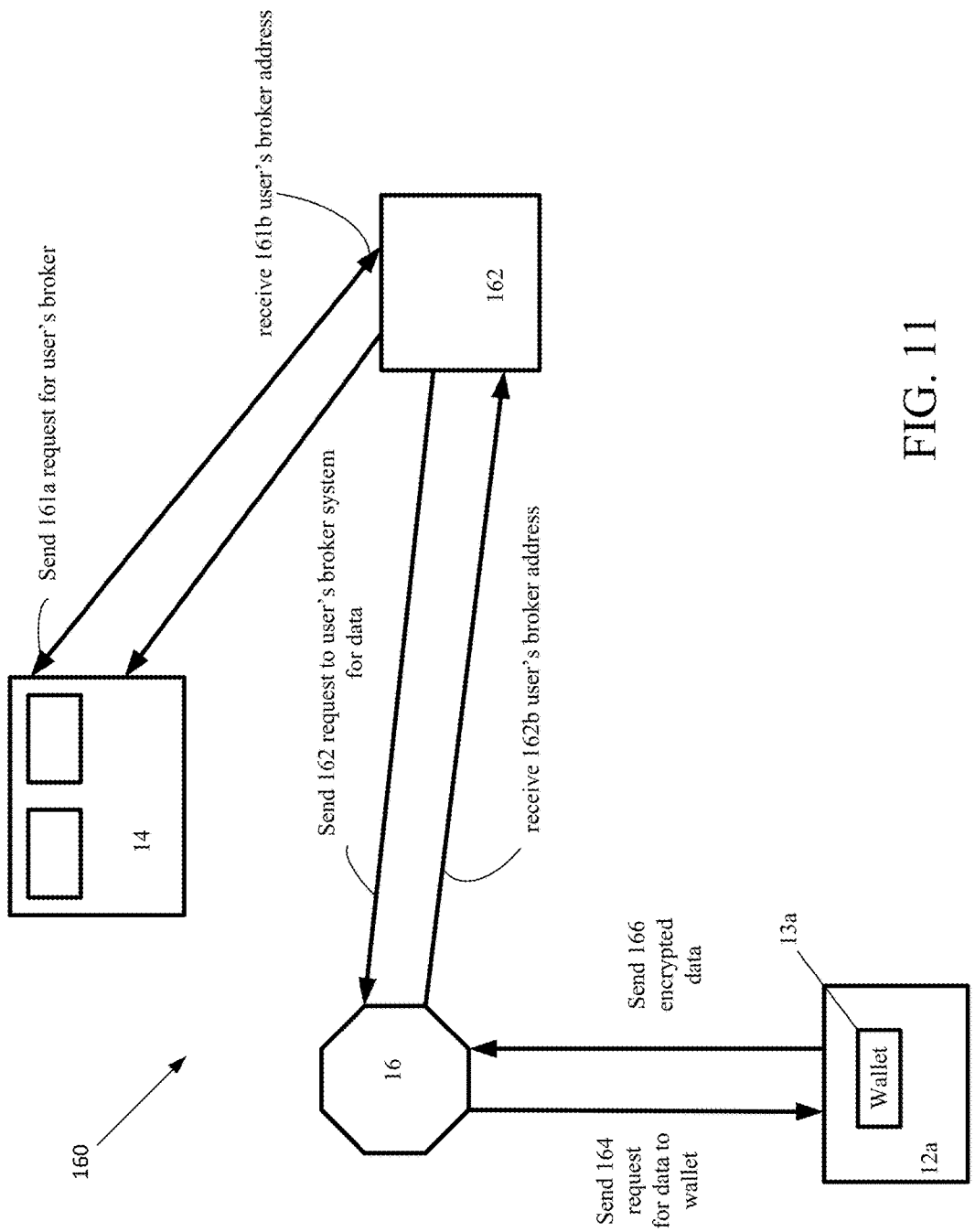
FIG. 11 is a flow diagram of an example of a use case with the wallet for the access control system of FIG. 10.

Referring now to FIG. 11, a diagram of a use case 160 and flow for the use case 160 where a third party system 162 is an access control system and requests information from the user device 12a (via a card reader or equivalent) that is part of a third party system 162. In this case, the broker system 16 can provide an asynchronous transfer between the user device 12a and the third party device 162 of access and privilege credentials (that will control various aspects of what a user can access and use on premises 110.

The third party system 162 sends a message request 161a to the distributed ledger 14 for the user's broker system and receives 161b a message that includes the address of the user's determined broker. The third party device 162 sends 163 a message to the user's determined broker 16, which message includes a request to access data on the user's wallet 13a. The request for data is sent 165 from the broker system 14 to the user's wallet 13a. The user's wallet 13a (or other application or user via a physical action using a user input device) either answers (yes or no) or simply ignores the message. The wallet can also be configured to automatically accept as a frequent guest. When the answer is yes, the user's wallet 13a (or other application) encrypts the data using an asymmetric encryption algorithm that uses the requestor's public key. The encrypted data is sent 167 from the user's wallet 13a to the broker system 16 so that only the two endpoints (user's wallet 13a and the third party system 162) can read the actual data. At the broker system 16, upon reception of the encrypted data from the user's wallet 18a, the broker system 16 sends the data to the third party system 162. The third party system takes such action as needed by sending a signal to unlock a door, as in FIG. 9. Another data flow is the case where the facility actually produces a list of authorized users in the distributed ledger. The ledger 14 is then checked to see if the user is one of the authorized users.

Figure 12:
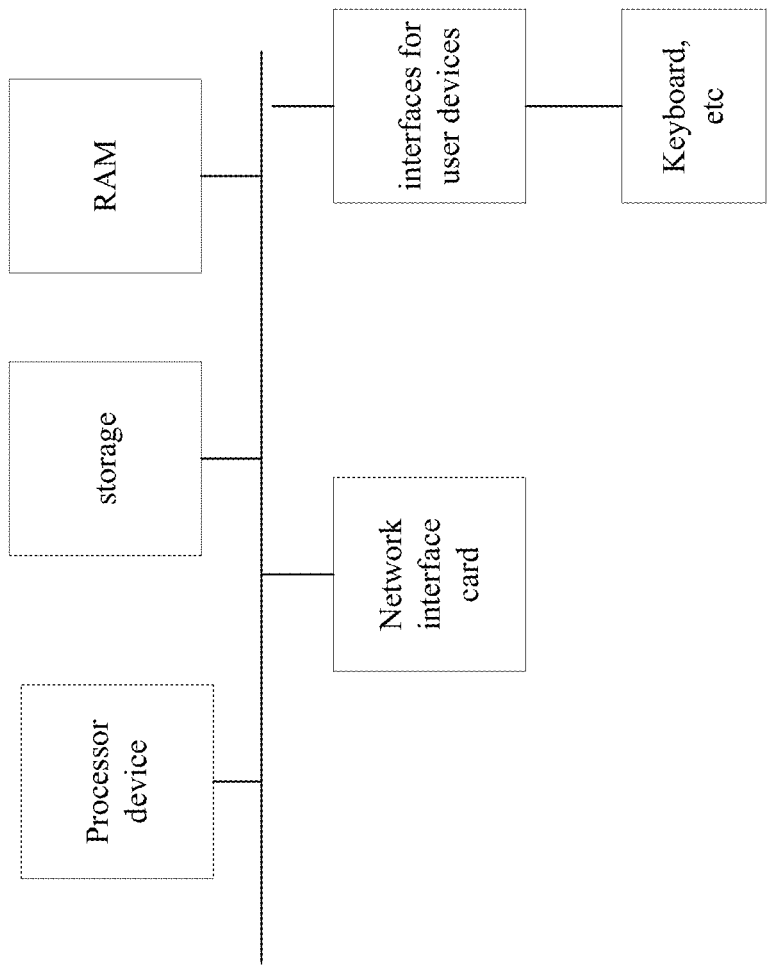
FIG. 12 is a block diagram of an exemplary device/system.

Referring now to FIG. 12, components of system/devices are shown. Memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Servers are associated with an IP address and port(s) by which it communicates with user devices. The server address may be static, and thus always identify a particular one of monitoring server to the intrusion detection panels. Alternatively, dynamic addresses could be used, and associated with static domain names, resolved through a domain name service. The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system comprises:
   one or more user devices comprising:
   a network interface device;
   a processor device; and
   memory comprising an identity wallet and a corresponding identity wallet application, wherein the processor device is configured to execute the corresponding identity wallet application and the identity wallet is configured to store identity information;
   a distributed ledger system comprising a sequential transaction database comprising plural distributed database systems and a first network interface device, wherein the distributed ledger system is configured to store a plurality of communication addresses, each of the plurality of communication addresses being associated with one of a plurality of service broker systems, wherein each of the plurality of service broker systems facilitates access to information of at least one of the one or more user devices;
   a service broker system comprising a computer system and a second network interface device configured to interface with the identity wallet and the distributed ledger system; and
   a third party system comprising a third network interface device, wherein the third party system is configured to:
   retrieve a first communication address of the plurality of communication addresses from the distributed ledger system by communicating a request to the distributed ledger system comprising an indication of a first user device of the one or more user devices; and
   send a message to the service broker system based on the first communication address to access first identity information in a first identity wallet of the first user device.

2. The system of claim 1 wherein the service broker system receives encrypted data from the identity wallet for transmission to the third party system.

3. The system of claim 1 wherein the service broker system sends to the third party system one or more messages, wherein the one or more messages are listings of verifying systems, upon receiving access requests from the third party system.

4. The system of claim 1 wherein the distributed ledger system includes a plurality of distributed databases comprising storage devices attached to different network-interconnected computers.

5. The system of claim 4 wherein the distributed ledger system stores on the plurality of distributed databases an attribute type, a hashed and encrypted value of an attribute, a digital signature of an attester of the hashed and encrypted value, and an address of the attester.

6. The system of claim 4 wherein the distributed ledger system stores on the plurality of distributed databases, a set of records corresponding to a profile of a user, with the records including an attribute type, a hashed and encrypted value of an attribute, a digital signature of an attester of the hashed and encrypted value, and an address of the attester, and with the distributed ledger system further configured to:
   add to the set of records one or more new records having new attributes of the user.

7. The system of claim 6 wherein the distributed ledger system stores on the plurality of distributed databases attribute types, hashed and encrypted values of attributes types, the digital signature of the attester of the hashed and encrypted values, and the address of the attester, with a second set of records corresponding to an access control profile of the user, and wherein the third party system is part of an access control system.

8. The system of claim 1, wherein the one or more user devices, the distributed ledger system, the service broker system, and the third party system are interconnected via electronic network.

9. A method comprises:
   retrieving, by a third party system, a first communication address of a plurality of communication addresses each associated with one of a plurality of service broker systems from a distributed ledger system by communicating a request to the distributed ledger system comprising an indication of a first user device, wherein the distributed ledger system is a sequential transaction database, wherein the sequential transaction database comprises plural distributed database systems and a network interface device, wherein the distributed ledger system stores the plurality of communication addresses, wherein each of the plurality of service broker systems facilitates access to information of at least one of a plurality of user devices;
   sending a message by the third party system to a first broker system based on the first communication address to access first information in an identity wallet of the first user device; and
   receiving, by the third party system, from the first broker system the first information in the identity wallet in the first user device.

10. The method of claim 9 wherein the first broker system receives encrypted data for transmission to the third party system from the identity wallet.

11. The method of claim 9 further comprising:
   receiving by the third party system from the first broker system a listing of verifying systems, upon receiving access requests from the third party system.

12. The method of claim 9 further comprising:
   receiving by the third party system from the distributed ledger system a second message including an attribute type, a hashed and encrypted value of an attribute, a digital signature of an attester of the hashed and encrypted value, and an address of the attester.

13. The method of claim 9, wherein the third party system is part of an access control system.

14. A system for use with a third party system comprising a first network interface device and configured to retrieve a network communication address from a distributed ledger system by communicating a request to the distributed ledger system and to send a message to a service broker system based on the network communication address to access identity information in an identity wallet of a user device, the system comprising:

the user device comprising the identity wallet, wherein the identity wallet stores the identity information and a corresponding identity wallet application, wherein the identity wallet application is stored in memory and executes on a processor device in the user device to manage the identity information;

the distributed ledger system, wherein the distributed ledger system is a sequential transaction database comprising plural distributed database systems and a second network interface device, wherein the distributed ledger system stores a plurality of network communication addresses each associated with one of a plurality of service broker systems, wherein each of the plurality of service broker systems facilitates access to the identity information of at least one of a plurality of user devices, wherein the distributed ledger system is configured to:

receive the request from the third party system for the network communication address of the service broker system associated with the user device, wherein the request comprises an indication of the user device; and determine the network communication address based on the indication of the user device;

the service broker system, wherein the service broker system comprises a computer system and a network interface device, wherein the network interface device is configured to interface between the identity wallet and the distributed ledger system.

15. The system of claim 14 wherein the distributed ledger system stores a user attribute hash, an encrypted value of a user attribute, an attester signature of the user attribute, and an attester address.

16. The system of claim 14 wherein the service broker system receives encrypted data from the identity wallet for transmission to the third party system.

17. The system of claim 14 wherein the service broker system sends to the third party system one or more messages, wherein the one or more messages are listings of verifying systems, upon receiving access requests from the third party system.

18. The system of claim 14 wherein the distributed ledger system stores on the plural distributed database systems an attribute type, a hashed and encrypted value of an attribute, a digital signature of an attester of the hashed and encrypted value, and an address of the attester.

19. The system of claim 14, wherein the user device, the distributed ledger system, the service broker system, and the third party system are interconnected via an electronic network.

20. The system of claim 14 wherein the distributed ledger system stores on the plural distributed database systems attribute types, hashed and encrypted values of the attribute types, digital signature of an attester of the hashed and encrypted values, and an address of the attester, with a set of records corresponding to an access control profile of a user, and wherein the third party system is part of an access control system.

* * * * *